US008964842B2

(12) United States Patent
Alfonso et al.

(10) Patent No.: US 8,964,842 B2
(45) Date of Patent: Feb. 24, 2015

(54) VIDEO CODING METHOD AND DEVICE, RELATED SCALABLE BITSTREAM AND COMPUTER PROGRAM PRODUCT

(75) Inventors: Daniele Alfonso, Magenta (IT); Tea Anselmo, Pinerolo (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 764 days.

(21) Appl. No.: 12/713,565

(22) Filed: Feb. 26, 2010

(65) Prior Publication Data

US 2010/0220785 A1    Sep. 2, 2010

(30) Foreign Application Priority Data

Feb. 27, 2009    (IT) .............................. TO2009A0142

(51) Int. Cl.
| | | |
|---|---|---|
| H04N 11/02 | (2006.01) | |
| H04N 19/142 | (2014.01) | |
| H04N 19/31 | (2014.01) | |
| H04N 19/114 | (2014.01) | |
| H04N 19/107 | (2014.01) | |
| H04N 19/61 | (2014.01) | |

(52) U.S. Cl.
CPC ..... *H04N 19/00163* (2013.01); *H04N 19/0043* (2013.01); *H04N 19/00054* (2013.01); *H04N 19/0003* (2013.01); *H04N 19/00781* (2013.01)
USPC .................................................. 375/240.13

(58) Field of Classification Search
None
See application file for complete search history.

(56) References Cited

U.S. PATENT DOCUMENTS

| | | | |
|---|---|---|---|
| 6,307,886 B1 | 10/2001 | Westermann | 375/240.09 |
| 6,480,543 B1 | 11/2002 | Pau et al. | 375/240.16 |
| 6,731,684 B1 | 5/2004 | Wu | 375/240.12 |
| 6,914,937 B2 | 7/2005 | Takenaka | 375/240.13 |
| 7,149,250 B2 | 12/2006 | Drieux et al. | 375/240.15 |
| 7,295,612 B2 | 11/2007 | Haskell et al. | 375/240.15 |
| 2002/0136297 A1* | 9/2002 | Shimada et al. | 375/240.04 |
| 2008/0181302 A1* | 7/2008 | Demircin et al. | 375/240.06 |

OTHER PUBLICATIONS

Matsuoka S et al: "Coding Efficiency Improvement with Adaptive GOP Size Selection for H. 2641 SVC", 3rd International Conference on Innovative Computing Information and Control (ICICIC 2008), IEEE, Piscataway, NJ, USA, Jun. 18, 2008, pp. 1-4, XP031341609ISBN: 978-0-7695-31 61 -8.*

Fernando W A C et al: Scene adaptive video encoding for MPEG and H263+ video, IEEE International Symposium on Circuits and Systems (ISCAS 2001), IEEE Piscataway, NJ, USA, vol. 2, May 6, 2001, pp. 249-252, XP010540625ISBN: 978-0-7803-6685-5.*

(Continued)

*Primary Examiner* — Mehrdad Dastouri
*Assistant Examiner* — James Anderson, II
(74) *Attorney, Agent, or Firm* — Allen, Dyer, Doppelt, Milbrath & Gilchrist, P.A.

(57) ABSTRACT

An encoder allows generating, starting from a sequence of digital video pictures, a time-scalable encoded bitstream obtained by applying to the pictures, a hierarchical prediction wherein the pictures are organized in Groups Of Pictures (GOPs). The GOPs may include base time layer pictures or Key Pictures for encoding as Inter or Intra, with and without motion-compensated prediction respectively. The GOPs may also include higher time layer pictures adapted to be selectively eliminated to effect time scalability of the encoded scalable bitstream. The encoder may detect scene changes in the sequence of digital video pictures, and, in the presence of a scene change, a first Key Picture after the scene change may be encoded as Intra.

15 Claims, 5 Drawing Sheets

Picture number:
0  1  2  3  4  5  6  7  8  9  10  11  12  13  14  15  16

SC

Picture type:
I0 B2 B1 B2 P0 B2 B1 B2 I0 B2 B1 B2 P0 B2 B1 B2 I0

New picture type:
I0 B2 B1 B2 I0 B2 B1 B2 P0 B2 B1 B2 P0 B2 B1 B2 I0

(56) References Cited

OTHER PUBLICATIONS

Daniele Alfonso et al: Performance analysis of the scalable video coding standardU, IEEE Packet Video 2007, Nov. 1, 2007, pp. 243-252, XP031170620 ISBN: 978-1 -4244-0980-8.*

Alfonso et al., "Adaptive GOP size control in H.264/AVC encoding based on scene change detection", Signal Processing Symposium, Jun. 2006, pp. 86-89.

Alfonso et al., "Performance analysis of the scalable video coding standard", Packet Video 2007, IEEE, Nov. 2007, pp. 243-252.

Fernando et al, "Scene adaptive video encoding for MPEG and H263+ Video", IEEE International Symposium on Circuits and Systems, vol. 2, May 2001, pp. 249-252.

Matsuoka et al., Coding efficiency improvement with adaptive GOP size selection for H.264/SVC, Innovative Computing Information and Control, Jun. 2008, pp. 356-359.

Schwarz et al., "Analysis of hierarchical B pictures and MCTF", IEEE, ICME 2006, pp. 1929-1932.

Schwarz et al, "Overview of the scalable video coding extension of the H.264/AVC standard", IEEE Transactions on Circuits and Systems for Video Technology, vol. 17, No. 9, Sep. 2007, pp. 1103-1120.

Yu et al. "A fast effective scene change detection and adaptive rate control algorithm", International Conference on Image Processing, IEEE, Oct. 1998, pp. 379-382.

\* cited by examiner

Picture number:
0  1  2  3  4  5  6  7  8  9  10  11  12  13  14  15  16

SC

Picture type:
I0  B2  B1  B2  P0  B2  B1  B2  I0  B2  B1  B2  P0  B2  B1  B2  I0

New picture type:
I0  B2  B1  B2  I0  B2  B1  B2  P0  B2  B1  B2  P0  B2  B1  B2  I0

VIDEO CODING METHOD AND DEVICE, RELATED SCALABLE BITSTREAM AND COMPUTER PROGRAM PRODUCT

FIELD OF THE INVENTION

The present disclosure refers to techniques for encoding digital video pictures. In particular, the present disclosure was devised with reference to the techniques for encoding digital video pictures in a scalable form.

BACKGROUND OF THE INVENTION

Figure 1:
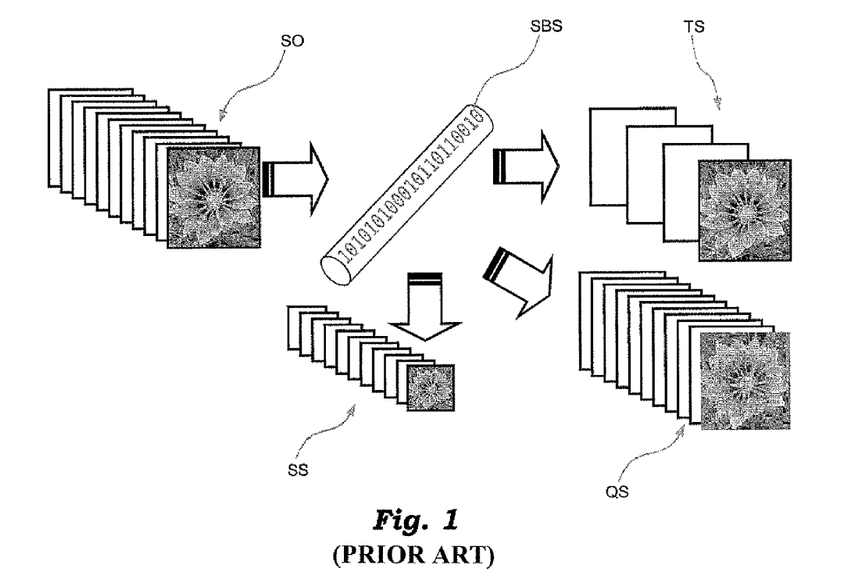
FIG. 1 is a schematic diagram of a prior art encoding system.

According to criteria schematically illustrated in FIG. 1, a system for encoding videos is referred to as scalable if, starting from an original sequence of pictures indicated with SO, it is capable of producing a "scalable" bitstream SBS in that it is susceptible to be (partially) decoded in such a manner to obtain video signals which, with respect to the video obtainable decoding the bitstream entirely, have:
 a low quality (quality scalability QS),
 a low spatial resolution (spatial scalability SS), and/or
 a low temporal resolution (temporal scalability TS).

An example of a video coding standard capable of bearing the temporal, spatial, and quality scalability is the technique known as Scalable Video Coding (SVC), which defines a set of scalable coding tools in an extension of the H.264/AVC video coding standard. See, for example, H. Schwarz, D. Marpe and T. Wiegand, "Overview of the Scalable Video Coding Extensions of the H.264/AVC Standard", IEEE Trans. On Circ. and Sys. for Video Tech., vol. 52, pp. 420-434, December 2007.

Figure 2:
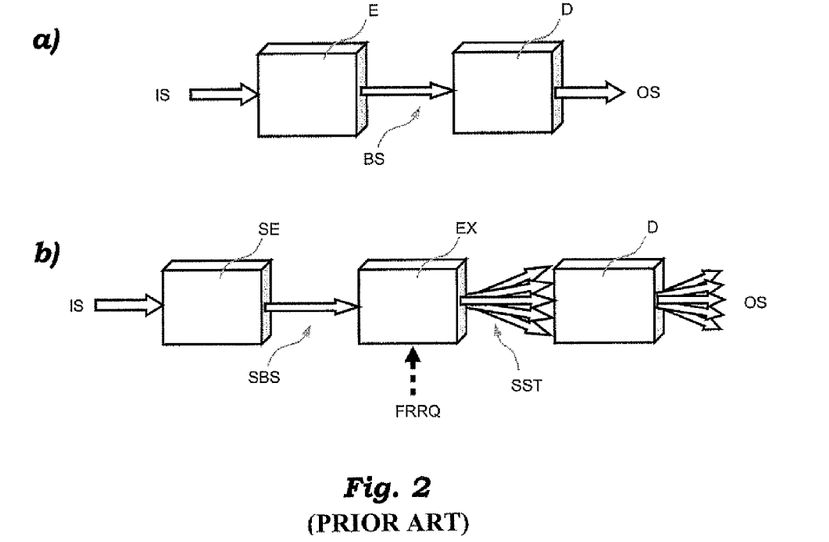
FIGS. 2a and 2b are schematic diagrams of encoding systems.

The difference between a traditional video coding/decoding system and a scalable system is schematically illustrated in FIGS. 2a and 2b. In a traditional system (FIG. 2a), the original video signal IS is input into an encoder E, which outputs a compressed bitstream BS. The bitstream BS is then intended to be decoded in a decoder D in such a manner to obtain an output video sequence OS corresponding to a single representation of the original video signal. The sequence OS has a given quality level, spatial resolution, and temporal resolution, according to the coding parameters used by the encoder to generate the bitstream BS.

In a scalable encoding system, for example, according to the abovementioned SVC standard, as schematically illustrated in FIG. 2b, the encoder (scalable) SE produces a scalable bitstream SBS from which it is possible to extract various sub-streams SST through a system indicated by an extractor EX. The extractor EX receives input parameters FRRQ regarding the quality and the desired spatial/temporal resolution. The extractor EX is capable of extracting from the scalable bitstream SBS sub-streams which, once decoded by a compatible decoder D, produce a representation OS of the original video signal having the desired parameters.

Figure 3:
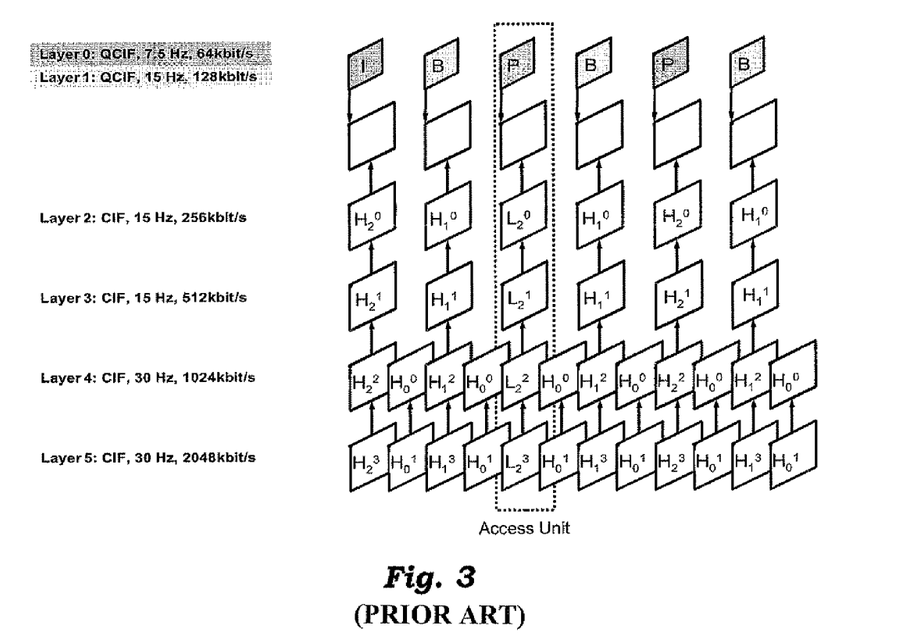
FIG. 3 schematically illustrates a scalable bitstream.

As shown, for example, in FIG. 3, a scalable bitstream typically includes a finite set of representations of the original video signal, coded in the form of a hierarchy of layers (i.e. Layer 0, Layer 1, Layer 2, etc.) with the aim of obtaining a greater coding efficiency with respect to that obtainable by coding the same representations separately through a traditional non-scalable coding system. The extractor EX thus allows the selection of the representation to be decoded among those present in the scalable bitstream.

The compressed data forming the scalable bitstream SBS is organized in a series of packets made up of a "header" (which contains syntax information) and a "payload" (which contains the actual compressed data). The extraction operation is performed by removing from the scalable bitstream the packets not required to obtain the desired representation. The removal occurs without decoding the payload, but simply relying on the information contained in the header of each packet. In a scene change in a video sequence, it is convenient for the coding system to interrupt the classic motion-compensated prediction scheme (typically the widely known I-B-B-P scheme) by dynamically reacting to the situation through a suitable variation of the coding mode of the single pictures, selecting the type of coding (i.e. I, P or B) in an adaptive manner.

A classic approach provides that the P picture successive to the scene change be transformed into an I picture, while the interposed B pictures maintain the same type of coding B. It is also possible to dynamically vary the Intra period, in other words, the distance between two Intra-pictures, and also disable the calculation of the movement between moment of scene change to reduce the computational complexity of the encoding.

When encoding a digital video, the pictures may be encoded in Intra or Inter mode (intra coded and inter coded respectively). In the Intra mode, the picture is encoded independently from the others, i.e. without using motion-compensated prediction. In the Inter mode, the picture is encoded through motion-compensated prediction, using other pictures of the video sequence as a time reference.

Figure 4:
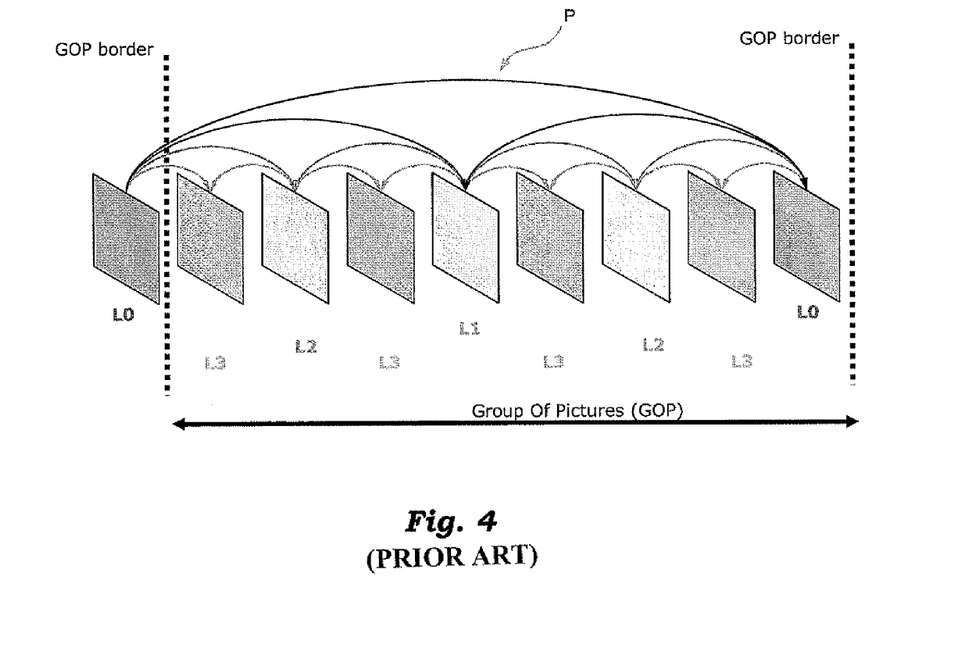
FIG. 4 schematically illustrates a motion compensated prediction structure.

To obtain temporal scalability, the motion-compensated prediction structure is arranged as a hierarchy, as shown for exemplification purposes in FIG. 4. A time layer is assigned to each picture of the sequence. Four layers, indicated as L0 (base layer), L1, L2 and L3 are used in the example of FIG. 4. Motion-compensated prediction (indicated with P) is performed under the condition that each picture belonging to a time layer Ln may only use pictures belonging to time layers Lm with m≤n as reference. In this manner, each picture belonging to a generic time layer Ln may be decoded independently from pictures belonging to higher time layers, and thus temporal scaling of the bit-stream may be performed by simply eliminating, from time to time, the data packets corresponding to the higher time layers, given that the decoding of the pictures belonging to the remaining layers shall not be influenced thereby. To perform the temporal scaling of the bitstream, the data packets corresponding to each picture contain, in the header, the information of the time layer to which the picture itself belongs, so that the extractor EX may know which packets of the bitstream are to be discarded, and which are not to be discarded.

Documents such as U.S. Pat. Nos. 6,731,684, 6,307,886, 7,149,250, 7,295,612 or 6,914,937 describe various systems for encoding non-scalable from a time point of view, and generally according to the classic I-B-B-P scheme widely used for MPEG-2 video applications. Thus, these documents describe coding methods based on the picture type I, P or B. Lastly, U.S. Pat. No. 6,480,543 is directed to a method for detecting a scene change in a video sequence.

SUMMARY OF THE INVENTION

The approaches for a type of encoding not scalable from a temporal point of view typically do not take into account the particular hierarchical relation between the pictures of a video sequence that allows temporal scalability to be obtained. In particular, by applying such approaches to a video coding system allowing temporal scalability, the bitstream produced would be jeopardized in its scaling functionalities, i.e. actually no longer scalable, or not uniformly scalable, given that the temporal prediction structure used in the Group Of Pictures (GOPs) in which the scene change occurs could be different from the structure used in all other GOPs. In addition, the bitstream could also have poor efficiency in terms of compression/quality performance.

Additionally, though the issue regarding the adaptation of the video coding to the scene changes has already been addressed, there arises the need to provide approaches applicable to time scalable coding systems, and in particular approaches capable of obtaining an adaptation to the scene change in case of time scalable coding systems, a problem yet addressed in the video coding context in case of a scene change. Thus, the object of the invention is that of meeting such a need.

According to the invention, the object is attained by a method having the characteristics referred to in the claims that follow. Furthermore, embodiments refer to a corresponding device (substantially a scalable encoder), as well as a related bitstream and to a computer program product, loadable in the memory of at least one computer and including software code portions capable of implementing the steps of the method when the product is run on at least one computer. As used herein, reference to such a computer program product is intended to be equivalent to the reference to a computer-readable medium carrying instructions for the control of the processing system to coordinate the implementation of the method. Reference to "at least one computer" is obviously intended to highlight the possibility that the present invention be implemented in modular and/or distributed form. The claims form an integral part of the technical disclosure provided herein in relation to the embodiments.

An embodiment may include a system dedicated to encoding time scalable videos. The system may allow dynamic adaptation of the temporal prediction structure used for encoding in such a manner to react to the scene changes possibly present in the input video signal, thus obtaining greater coding efficiency with respect to the prior art. Simultaneously, the system may allow for maintaining the temporal scalability characteristics unaltered in the bitstream produced in output. An embodiment, includes a video coding system which supports temporal scalability, and more particularly using a method for detecting scene change.

BRIEF DESCRIPTION OF THE DRAWINGS

The embodiments shall be described, purely for exemplary and non-limiting purposes, with reference to the attached representations, wherein.

DETAILED DESCRIPTION OF THE PREFERRED EMBODIMENTS

Illustrated in the following description are various specific details aimed at an in-depth understanding of the embodiments. The embodiments may be obtained without one or more specific details, or through other methods, components, materials, etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments. References herein are used for facilitating the reader and thus they do not define the scope of protection or the range of the embodiments.

Figure 5:
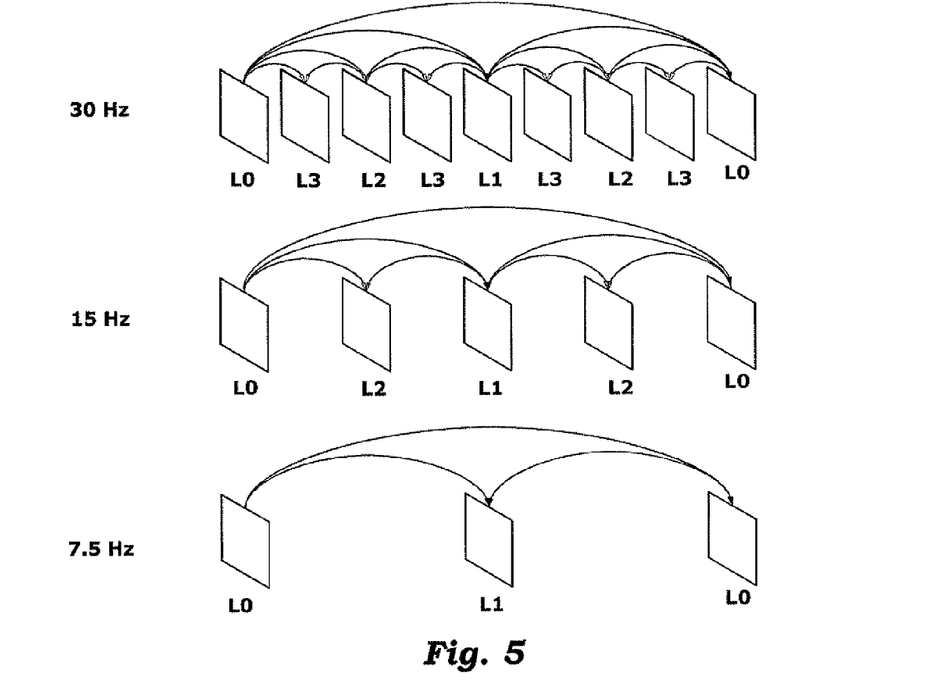
FIG. 5 illustrates a technique for bisecting a frame rate in accordance with the present invention.

FIG. 5 shows, as an introduction, a time scaling method obtainable starting from the structure shown in FIG. 4. The prediction structure P shown in FIG. 4 is characterized by the concept of Group Of Pictures (GOP). Each GOP includes all the pictures included between two "Key Pictures" at the base time layer L0, and more precisely, in the example illustrated herein, all the pictures included between the first picture having zero time layer L0 (excluded), up to the successive picture of the zero time layer L0 (included), with a sequence in the GOP of pictures of a higher time layer, i.e. L3, L2, L3, L1, L3, L2, L3. The first picture of the sequence can be considered a special case of a GOP made up of only one picture having a zero time layer and encoded as Intra.

The input video signal is thus encoded as a succession of GOPs, where the length of the GOP (thus corresponding to the distance between two pictures of the zero time layer) and the particular time prediction structure used for encoding the pictures within each GOP determine the time scalability of the bitstream output from the encoder.

Without derogating from generality, it can be assumed that all the GOPs of the treated sequence have the same length and use the same time prediction structure. This hypothesis guarantees uniformity in the temporal scalability over the entire length of the coded sequence, for example, through a uniform bisection of the frame rate in case of a dyadic hierarchical structure.

The Intra-pictures offer a lower compression efficiency with respect to Inter-pictures. On the contrary, Inter-pictures cause a progressive deterioration of the quality of the coded video signal, given that the temporal prediction mechanism causes the error triggered by quantization to propagate cumulatively from one picture to another. Some pictures of the sequence may be encoded as Intra to stop the propagation of this cumulative error. The ratio between the number of pictures encoded as Intra and Inter within the sequence represents a trade-off between the compression efficiency and quality.

A possible approach establishes a fixed interval between two Intra-pictures, for example, one each 0.5 s or one each is of video. In standard DVD video, which uses MPEG-2, the technical specifications require a maximum 0.6 s interval between two Intra-pictures.

In time scalable coding, the Intra-pictures may always belong to the same time layer 0. In this manner, the positive effect of the improved quality of the single Intra-picture may be propagated on all the other time layers of the sequence, given that they are directly or indirectly predicted starting from the zero layer. Furthermore, given that the pictures in the zero time layer are intended not to be removed by the scalable bitstream, they may be contained in any sub-stream intended to be extracted from the initial scalable bitstream. Thus, the cumulative quantization error of any possible sub-stream is stopped.

For coding efficiency purposes, it may be suitable that all the other pictures of the GOP, i.e. the time layers different from 0, be Inter-coded if possible. Inter-coding is more efficient if there is a considerable time correlation between the pictures of the sequence, which occurs when the pictures represent the same scene (as better observable hereinafter with reference to FIG. 6a). However, when there is a scene change (as better observable hereinafter with reference to FIG. 6b), the time correlation between the pictures preceding the scene change and the subsequent pictures is null or close to zero. Thus, motion-compensated prediction is not capable of bringing any considerable advantage, and the efficiency of the entire coding process is generally lower.

The hierarchical prediction used in the example considered herein is of the dyadic type (i.e. of the binary tree type). The elimination of each time layer from the bitstream allows the bisection of the time resolution of the output video sequence, i.e. the reduction of the number of pictures per second ("frame rate").

The temporal prediction structure shown in FIG. 4 is not the only one possible. Other structures can be used, in particular, maintaining the possibility to bisect the frame rate of the decoded sequence for each time layer eliminated from the scalable bitstream.

Temporal scalability is advantageous given that it allows the scalable bitstream to be adapted to the decoding system that shall process it in at least two different modes. One mode includes adaptation to the maximum computational complexity (i.e. to the maximum power consumption sustainable or desired in a given moment) in the decoding system. By temporally scaling the bitstream, the number of pictures to be decoded per time unit reduces, hence reducing the complexity of the decoding process and the respective power consumption.

A second mode includes adaptation to possible limitations of the screen equipped with the decoding terminal in terms of a maximum number of pictures that can be displayed per time unit. Should the screen be characterized by a lower frame rate with respect to the maximum obtainable by the scalable bitstream, time scaling of the bitstream up to obtaining the frame rate meeting the limits of the terminal screen is sufficient.

Additionally, regarding temporal scalability, the hierarchical temporal prediction leads to the following advantages. First, a greater encoding efficiency is obtained with respect to the classic IBBP or IPPP coding structures used in almost all video applications according to the MPEG-2, MPEG-4 or H.264/AVC standards (see, for example, H. Schwarz, D. Marpe and T. Wiegand, "Analysis of Hierarchical B pictures and MCTF", in Proc. of IEEE Int. Conf. on Multimedia and Expo, Toronto, Canada, July 2006). Additionally, it shows greater robustness against transmission errors, given that each transmission error on a picture belonging to a time layer Ln may have an impact only on the pictures belonging to higher time layers, but will generally not jeopardize the decoding of the pictures belonging to lower time layers. This allows easier recovery of the error by the decoder.

The approach considered herein adopts a hierarchical temporal prediction structure and has a higher coding efficiency of a scene change in a video coding system, which allows the time scalability, i.e. with a hierarchical structure for motion-compensated prediction of the pictures.

In an embodiment, it is assumed that the scalable video encoder (SE of FIG. 2) divides the sequence into a set of GOPs having an identical structure and length N. Each picture of the GOP (as schematically illustrated in FIG. 4) is identified by a progressive number i and by a time index t which indicates the time layer thereof. As already explained, the pictures of a time layer greater than 0 are Inter-coded for coding efficiency purposes in each GOP, while those of time layer 0 (also referred to as Key Pictures) may be Intra or Inter-coded.

It shall also be assumed that each GOP includes only one Key Picture (L0) corresponding to the last picture of the GOP itself and that a picture each M of the sequence (IS) encoded as Intra, where M is a multiple of N, which is the length of the GOP. The encoder incorporates a counter C which starts from the value M and is increased by 1 after each new coded picture. When the counter reaches zero, the current picture is encoded as Intra and the counter returns to value M.

In order to obtain temporal scalability, each Inter-picture belonging to a given time layer t>0 uses pictures belonging to time layers t'≤t as references for the motion-compensated prediction. As long as the input sequence does not include any scene change (see FIG. 6a), the GOPs are encoded as specified up to now, thus allowing temporal scalability, a bisection scheme based on the frame rate as illustrated in FIG. 5. FIG. 5, for example, shows how, starting from the GOP structure illustrated in FIG. 4, ideally referring to a frame rate equivalent to 30 Hz, it is possible to perform a bisection leading to the elimination of pictures L3 (reducing the frame rate to 15 Hz) and, additionally, a bisection leading to the elimination of pictures L2 (reducing the frame rate to 7.5).

When a scene change is detected inside the current GOP, as described in, for example, U.S. Pat. No. 6,480,543, the encoder SE reacts, maintaining the time prediction structure inside the GOP unaltered in such a manner that the time scalability is not jeopardized.

Figure 6:
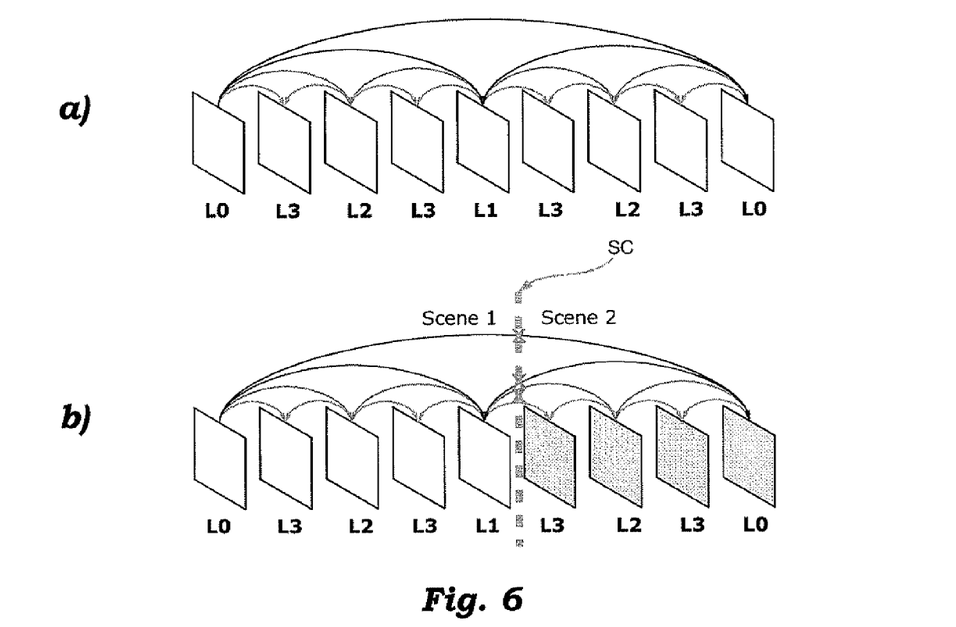
FIGS. 6a, 6b, and 7 illustrate management of a scene change in accordance with the present invention.
Figure 7:
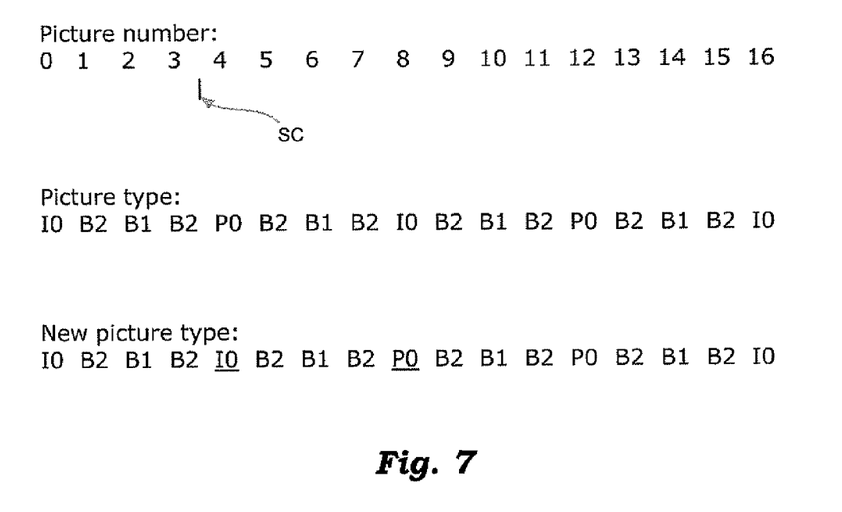

To do this, as illustrated in FIG. 6b and in the diagram of FIG. 7, the successive Key Picture of the current GOP is scheduled to be encoded as Intra, regardless of whether the counter C has reached zero or not. At such picture, the value of the counter C is increased by a value equivalent to M.

The object of the two previous operations is moving the occurrence of the successive Intra-picture of the sequence from a stable point to a convenient point successively to the scene change. In this manner, the Intra-pictures are used by the encoder, not in an arbitrary manner, but only when actually required, i.e. to recover the coding quality, which is lowered by the occurrence of the scene change. Thus, it is possible for the encoder SE to use Intra Period values greater than usual, obtaining greater compression and simultaneously maintaining an ideal control of the cumulative error.

In FIG. 6b and in the diagram of FIG. 7, the scene change is indicated with SC. In the diagram of FIG. 7 the first line indicates the Picture number with the scene change (SC) between scene 1 and scene 2, which intervenes between picture 3 and picture 4.

In the example of FIG. 7, a sequence of 17 pictures is assumed, with Picture Number from 0 to 16, encoded with a GOP size N=4 and an Intra Period M=8. Thus, in the coded sequence there is a key picture each 4 pictures, and an Intra picture each 8 pictures. The type of encoding of each picture together with the corresponding time layer is indicated in the second line with the writing "Picture Type."

The second and third line of FIG. 7 indicate, respectively, the picture type initially provided for in the coded sequence (had the scene change not occurred), and the "new" picture type used in the coding sequence taking into account the fact that the scene change has occurred. In particular, it is possible to see that the picture 4 successive to the scene change SC, intended to be a picture P0, is instead encoded as an Intra-picture I0, and the picture 8, intended to be an Intra-picture I0, is encoded as an (Inter) picture P0. It may be observed that, in the example of FIG. 7, each picture maintains the time layer unaltered, the first key picture after the scene change is encoded as Intra, and the successive Intra Period is 12 pictures long instead of 8.

Substantially, the embodiment considered herein provides for detecting the possible presence of scene changes in the sequence IS of digital video pictures. In the presence of a scene change SC, the first Key Picture successive to the scene change SC is encoded as Intra (I0) in any case.

The embodiment considered herein also provides for that, in the absence of scene changes SC, a picture each M pictures in the sequence IS of input digital video pictures be encoded as Intra. This occurs by activating a count corresponding to M after each picture encoded as Intra picture, where M is a multiple of N number of pictures included in each GOP. In the presence of a scene change SC detected in the sequence IS of input video pictures, the abovementioned count is activated after the abovementioned first Key Picture successive to the change, which is encoded as Intra (I0) in any case.

Still in the embodiment considered herein, in the presence of a scene change SC, identified between the pictures of the sequence IS included in the count activated after the abovementioned first Key Picture encoded as Intra, is at least one picture which, in the absence of scene changes SC, would otherwise be intended to be encoded as Intra. The picture, thus identified (the picture 8, in the example of FIG. 7) is encoded as Inter (P0).

Comparing the embodiment considered herein with a traditional encoding, in which the Intra-pictures are arranged at predetermined intervals, the following advantages are observable:

improved average encoding efficiency, i.e. enhanced average quality considering the same bit-rate, or a lower bit-rate considering the same average quality;

improved encoding efficiency around the scene change, i.e. related to the pictures immediately preceding and successive to the scene change; and improved buffer control for applications using Constant Bit-Rate (CBR) or VBR rate control.

The rate control processes are based on the detection of the filling level of the encoder output buffer (corresponding to the decoder input buffer). A scene change produces a peak in the buffer filling level due to a lower coding efficiency. Thus, the detection of the scene change allows a system provided with the rate control to react in a suitable manner to best control the compromise between bit-rate and quality in output at the coding system.

An embodiment provides for avoiding calculating the movement through the time period of the scene change. Each picture successive to the scene change does not use pictures preceding the scene change as reference, and vice versa.

An embodiment provides for eliminating useless references from the list of reference pictures of each picture belonging to the GOP in which the scene change was detected. This process has no impact on the compression efficiency, but it allows considerably reducing the complexity of the encoding process eliminating useless operations of calculating the movement between pictures uncorrelated from a time point of view. At the end of the reference elimination process, should a picture be without possible references, such picture shall be encoded as Intra, though it does not belong to the zero time layer. In this case the counter C is not reset.

Figure 8:
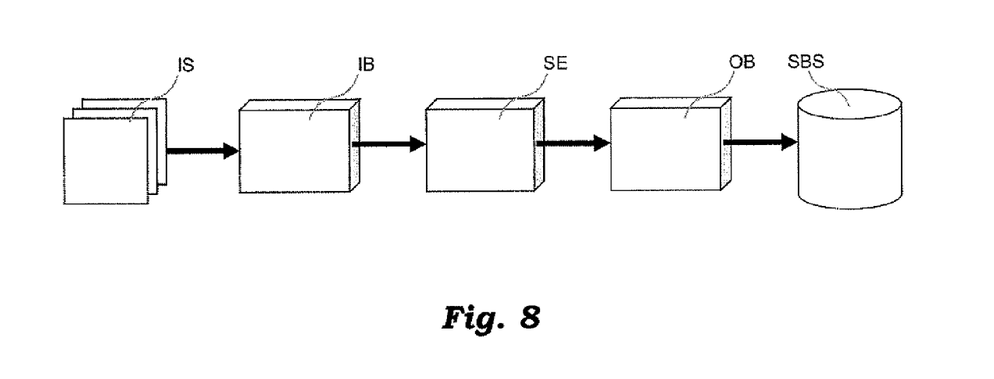
FIG. 8 is a schematic block diagram of a coding system in accordance with the present invention.

The block diagram of FIG. 8 refers to a possible system architecture suitable to implement the approach considered herein. In the diagram of FIG. 8, a sequence of input digital video pictures IS is supplied, possibly through an input buffer IB, to a time scalable encoder SE which produces a compressed scalable bitstream SBS in output. Reference OB indicates an output buffer possibly associated to the output of the scalable encoder SE. In compliance with the diagram of FIG. 7, each picture of the video sequence IS can be assigned a progressive number i=0, 1, 2, etc. corresponding to the position of each picture in the initial sequence, i.e. to the order of display of the picture itself.

As already observed with reference to FIGS. 4 and 5, the encoder SE may encode the pictures of the sequence IS in a series of GOPs, each of which has the same length N. Each picture may be assigned a second index t indicating the respective time layer to obtain the time scalability. In particular, it can be assumed that the last picture of each GOP has a zero time layer, and that the other pictures have a time layer different from zero, with a time index encoded in the output bitstream at each encoded picture. The first picture of the sequence, to which order number i=0 corresponds, may be considered a particular case of GOP made up of a single picture encoded as Intra and having a zero time layer.

In an embodiment, the length of the GOP N is a power of 2, with the pictures of the GOP numbered from 1 to N, and the encoder SE may use the following process to establish the time layer of the pictures of a GOP.

```
level = log2(N)
start = 1;
step = 2;
while ( level >= 0 )
{
    for ( k=start; k<=N; k+=step )
        t[k] = level;
    level = level – 1;
    start = start * 2;
    step = step * 2;
}
```

The pictures having a zero time layer (L0) may be encoded as Intra (i.e. without motion-compensated prediction) or as Inter (i.e. using motion-compensated prediction), while it is assumed that the pictures having a time layer different from zero are encoded as Inter.

Each picture encoded as Inter is motion-compensated with respect to one or two reference pictures selected from among a list of possible reference pictures. For each picture belonging to a given time layer t, the list of reference pictures may be built through a process selected in such a manner to contain only pictures having a time layer q≤t. To reduce encoding and display delay, the backward temporal prediction (i.e. using, for example, a picture having a greater order number with respect to the current picture) is carried out using, for example, only pictures belonging to the current GOP, while the forward temporal prediction (i.e. using, for example, a picture having a smaller order number with respect to the current picture) uses pictures belonging to the current GOP or even preceding GOP.

In an embodiment, each picture of the time layer t=0, if encoded as Inter, uses, for example, only the picture of the picture of layer t=0 belonging to the preceding GOP, while all the pictures of time layer t>0 use, for example, one or two pictures having order numbers i' and i" respectively and time layer t' and t" respectively, having the following conditions:

a. t'<t, with t–t' smallest possible
b. t"<t, with t–t" smallest possible
c. i'<i with i–i' smallest possible
d. i">i with i"–i smallest possible The first picture of the sequence, identified by i=0, is encoded as Intra. The distance between two Intra-pictures is assumed predetermined and equivalent to M, where M is a multiple of N. The encoder SE includes a counter started at a value M and decreased by 1 each time a picture is encoded. When the counter reaches zero, the current picture is encoded as Intra and the counter C is once again started at M. In this manner, the pictures encoded as Intra in the sequence are the pictures having order number i=0, M, 2M, 3M, etc. Each Intra-picture generally always corresponds to the end of a GOP in the sequence, or to the first picture of the sequence itself, and thus it is a picture having a zero time layer.

Before encoding each GOP, the pictures may possibly be accumulated in the input buffer IB and subjected to pre-analysis to determine the presence of scene changes in the GOP. The approach considered herein is also independent from the method selected for detecting scene changes, which, for example, may be implemented as described in U.S. Pat. No. 6,480,543.

In case no scene change is detected in the current GOP, the encoding occurs as specified at the previous points. Otherwise, in case of a scene change corresponding to a time period s, with s corresponding to the order number of the first picture successive to the scene change, the encoder SE operates as described below.

The last picture of the current GOP where the scene change occurred is encoded as Intra in any case, even if the counter C thereat has a value different from zero. When such picture is encoded, the counter C is increased by an amount equivalent to M even if it has not yet reached the zero value. In addition, it is possible to establish that the counter C can not exceed a maximum value M'. In such case, if C>M' then the value of C is started at M'.

Additionally to the previous point, the system may update the list of reference pictures for the pictures to be encoded inside the current GOP as follows. For each picture of the GOP having order number i>=s, all the pictures having order number i'<s in the list of reference pictures are removed from such list. For each picture of the GOP having order number i<s, all the pictures having order number i'>=s in the list of reference pictures are removed from such list. Possibly, for each picture of the GOP having order number i>=s and time layer t, each reference picture removed from the list may be replaced by another reference picture belonging to the current GOP of the sequence having index i'>=s and time layer t'<=t. Possibly, for each picture of the GOP having order number i<s and time layer t, each reference picture removed from the list may be replaced with another reference picture belonging to the current GOP of the sequence (or to a preceding GOP) and having index i'<s and time layer t'<=t.

Should the list of reference pictures for any picture of the current GOP remain empty, the picture in question is encoded as Intra. In such case, at such picture, the counter C is not increased, but decreased by 1.

Figure 9:
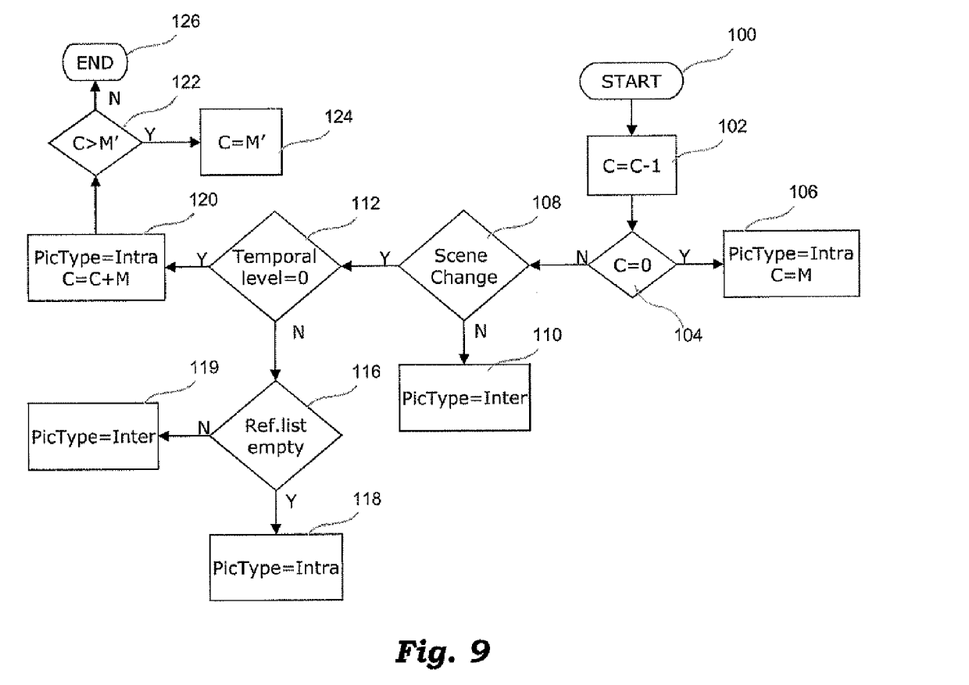
FIGS. 9 and 10 are flow charts illustrating operation of the embodiments in accordance with the present invention.

The process for updating the counter C and the ensuing determination of the Intra or Inter coding for each picture depending on the time layer and the detection of the scene changes in the current GOP is illustrated by the flow chart of FIG. 9. After an initial step 100, in a step 102 the counter C is increased by 1 before verifying, in a step 104, whether the count has reached zero. Should that be the case (positive result of step 104), in a step 106, the picture type is selected Intra and the counter is reset to value M. Otherwise (negative result of step 104), in a step 108, it is verified whether a scene change has occurred.

If there has been no scene change (negative result of step 108), the picture type is selected Inter. If a scene change has occurred (positive result of step 108), in a step 112 it is verified whether the time layer of the picture is 0. Should the verification give a negative result, after ascertaining the content of the list of reference pictures (step 116), the picture type is selected as follows:

Intra (step 118) if the list is empty (positive result of step 116); and

Inter (step 119) if the list is not empty (negative result of step 116).

Figure 10:
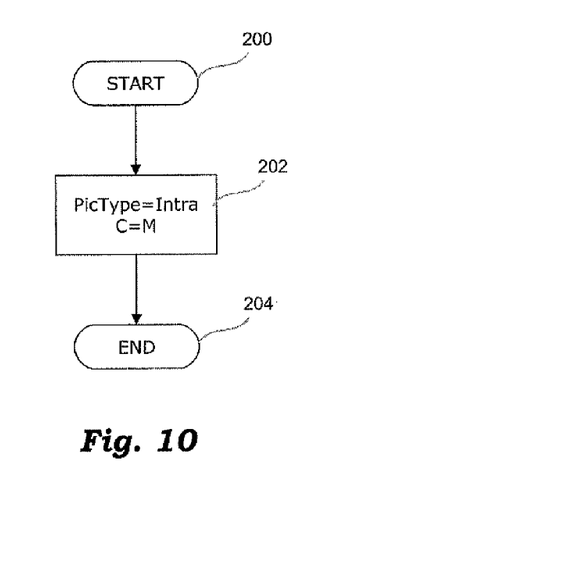

On the contrary, if step 112 gives a positive result, indicating that the time layer of the picture is 0, in a step 120 the picture type is selected Intra and the count value of the counter is increased by value M. In a successive step 122, it is verified whether the count value increased is greater than the threshold M'. Should that be the case (positive result of step 122), the counter is reset to value M' (step 124). Otherwise (negative result of step 122), the process is concluded (step 126). The process of FIG. 9 is performed for each picture of the sequence, excluding the first, for which the "degenerated" flow chart of FIG. 10 applies, including, after a start step 200, a step 202 in which the picture type is selected Intra and the count value of the counter is set to value M, whereupon the process is concluded (step 204).

The use of the approach described herein is immediately observable from the decoding of the scalable bitstream, which implies the use of all information regarding the time prediction structure, the type of encoding, and the time layer of each picture. Such information is the basis of correct decoding of the bitstream and its possible scaling, and thus it is in the bitstream itself. The process described herein is suitable to be implemented in an encoder software complying with the Scalable Video Coding (SVC) standards.

Experiments carried out by the applicant show that due to the detection of the scene change and the ensuing adaptation of the Intra Period (distance between two Intra-pictures), it is possible to encode a test sequence with a 9.14% gain on the compression ratio considering the same quality when the maximum Intra Period is 32, or up to 10.84% gain when no limit is set regarding the maximum distance between two Intra-pictures. When using a CBR control, comparing the results in terms of a quality trend (YPSNR) of each picture of the sequence, respectively in the case of CBR without controlling the scene change, and in the case of CBR through the process described herein, the approach described provides a much more stable and uniform encoding quality regardless of the scene changes contained in the test sequence.

In particular, observing the trend of the quantization parameter (QP) determined by the CBR, in the case of encoding without controlling the scene change, the QP reaches up to the maximum allowed by the standard, causing an unacceptable deterioration of the subjective and objective quality of the video, while the encoding through the process described herein allows maintaining a much better control on the quantization step, which remains on more uniform and lower values, both averagely and in proximity to the scene changes. The approach described herein provides a time scalable video encoding, with the possibility of dynamically adapting the temporal prediction structure used for encoding in such a manner to react to the scene changes possibly present in the input video signal, obtaining greater encoding efficiency with respect to the prior art. At the same time, the approach described herein allows maintaining the characteristics of time scalability in the bitstream produced in output unaltered. Without prejudice to the underlying principles, the details and embodiments may vary, even significantly, with respect to what has been described herein by way of non-limiting example only, without departing from the scope of the invention, as defined by the annexed claims.

That which is claimed:

1. A method of generating, from a sequence of digital video pictures, a time-scalable encoded bitstream by applying to the digital video pictures a hierarchical prediction, each digital video picture having a time layer associated therewith, and each digital video picture being predicted using motion-compensation so that each digital video picture of a time layer $L_n$ uses digital video pictures of time layers $L_m$ with m≤n, the digital video pictures being arranged in Groups Of Pictures (GOPs) comprising key pictures in a base time layer for being encoded as one of inter coded with motion-compensated prediction and intra coded without motion-compensated prediction, and higher time layer pictures for being selectively eliminated to effect time scalability of the time-scalable encoded bitstream, the GOPs having a number N of pictures associated therewith, the method comprising:

detecting a scene change in the sequence of digital video pictures;

encoding as intra coded, a key picture after the detected scene change, while maintaining the time layer of each digital video picture;

if no scene change is detected encoding as intra coded a picture out of M pictures in the sequence of digital video pictures by activating a count corresponding to M after each picture encoded as intra coded, wherein M is a multiple of the number N; and if a scene change is detected activating the count after the key picture encoded as intra coded, if a scene change is detected, identifying, in the pictures in the sequence of digital video pictures included in the count activated after the key picture encoded as intra coded, at least one picture to be encoded as intra coded if no scene change is detected, and encoding as inter coded the at least one picture identified to be encoded as intra coded.

2. The method of claim 1, wherein encoding as intra coded, a key picture after the detected scene change comprises encoding as intra coded, a first key picture after the detected scene change.

3. The method of claim 1, further comprising encoding as intra coded a first picture in the sequence of digital video pictures.

4. The method of claim 1, further comprising encoding the higher time layer pictures as inter coded if no scene change is detected.

5. The method of claim 1, wherein a last picture of each GOP comprises one of the key pictures.

6. The method of claim 1, wherein if a scene change is detected, eliminating pictures preceding and following the scene change from a list of references for a motion-compensated prediction of the digital video pictures in the sequence following and preceding the scene change.

7. The method of claim 6, wherein if the list of references is empty from the eliminating, encoding as intra coded the picture to be predicted starting from the references eliminated from the list, regardless of the picture being a higher time layer picture.

8. A method of generating an encoded bitstream from a sequence of digital video pictures, each having a time layer associated therewith, and each digital video picture being predicted using motion-compensation so that each digital video picture of a time layer $L_n$ uses digital video pictures of time layers $L_m$ with m≤n, the sequence of digital video pictures being arranged in Groups Of Pictures (GOPs) comprising key pictures in a base time layer for being encoded as one of inter coded and intra coded, and higher time layer pictures, the GOPs having a number N of pictures associated therewith, the method comprising:

detecting a scene change in the sequence of digital video pictures; and encoding as intra coded, a key picture after the detected scene change, while maintaining the time layer of each digital video picture;

if no scene change is detected encoding as intra coded a picture out of M pictures in the sequence of digital video pictures by activating a count corresponding to M after each picture encoded as intra coded, wherein M is a multiple of the number N; and if a scene change is detected activating the count after the key picture encoded as intra coded, if a scene change is detected, identifying, in the pictures in the sequence of digital video pictures included in the count activated after the key picture encoded as intra coded, at least one picture to be encoded as intra coded if no scene change is detected, and encoding as inter coded the at least one picture identified to be encoded as intra coded.

9. The method of claim 8, wherein encoding as intra coded, a key picture after the detected scene change comprises encoding as intra coded, a first key picture after the detected scene change.

10. A device for generating a time-scalable encoded bitstream from a sequence of digital video pictures by applying a hierarchical prediction to the digital video picture, each digital video picture having a time layer associated therewith, and each digital video picture being predicted using motion-compensation so that each digital video picture of a time layer $L_n$ uses digital video pictures of time layers $L_m$ with m≤n, the pictures being arranged in Groups Of Pictures (GOPs) comprising key pictures in a base time layer for being encoded as one of inter coded with motion-compensated prediction and intra coded without motion-compensated prediction, and higher time layer pictures for being selectively eliminated to effect time scalability of the time-scalable encoded bitstream, the GOPs having a number N of pictures associated therewith, the device comprising:

a controller configured to detect a scene change in the sequence of digital video pictures, encode as intra coded, a key picture after the detected scene change, while maintaining the time layer of each digital video picture, if no scene change is detected encode as intra coded a picture out of M pictures in the sequence of digital video pictures by activating a count corresponding to M after each picture encoded as intra coded, wherein M is a multiple of the number N, and if a scene change is detected activate the count after the key picture encoded as intra coded, if a scene change is detected, identify, in the pictures in the sequence of digital video pictures included in the count activated after the key picture encoded as intra coded, at least one picture to be encoded as intra coded if no scene change is detected, and encode as inter coded the at least one picture identified to be encoded as intra coded.

11. The device of claim 10, wherein said controller is configured encode as intra coded, a first key picture after the detected scene change.

12. The device of claim 10, wherein said controller is configured to encode as intra coded a first picture in the sequence of digital video pictures.

13. The device of claim 10, wherein said controller is configured to encode the higher time layer pictures as inter coded if no scene change is detected.

14. A non-transitory computer-readable medium for generating, from a sequence of digital video pictures, a time-scalable encoded bitstream by applying to the digital video pictures a hierarchical prediction, each digital video picture having a time layer associated therewith, and each digital video picture being predicted using motion-compensation so that each digital video picture of a time layer $L_n$ uses digital video pictures of time layers $L_m$ with m≤n, the digital video pictures being arranged in Groups Of Pictures (GOPs) comprising key pictures in a base time layer for being encoded as one of inter coded with motion-compensated prediction and intra coded without motion-compensated prediction, and higher time layer pictures for being selectively eliminated to effect time scalability of the time-scalable encoded bitstream, the GOPs having a number N of pictures associated therewith, the computer-readable medium comprising:

a computer-executable module for
   detecting a scene change in the sequence of digital video pictures,
   encoding as intra coded, a key picture after the detected scene change, while maintaining the time layer of each digital video picture,
   if no scene change is detected
      encoding as intra coded a picture out of M pictures in the sequence of digital video pictures by activating a count corresponding to M after each picture encoded as intra coded, wherein M is a multiple of the number N, and
   if a scene change is detected
      activating the count after the key picture encoded as intra coded, if a scene change is detected,
      identifying, in the pictures in the sequence of digital video pictures included in the count activated after the key picture encoded as intra coded, at least one picture to be encoded as intra coded if no scene change is detected, and
      encoding as inter coded the at least one picture identified to be encoded as intra coded.

15. The non-transitory computer-readable medium of claim 14, wherein the computer-executable module is for encoding as intra coded, a first key picture after the detected scene change.

* * * * *